United States Patent Office 3,282,669
Patented Nov. 1, 1966

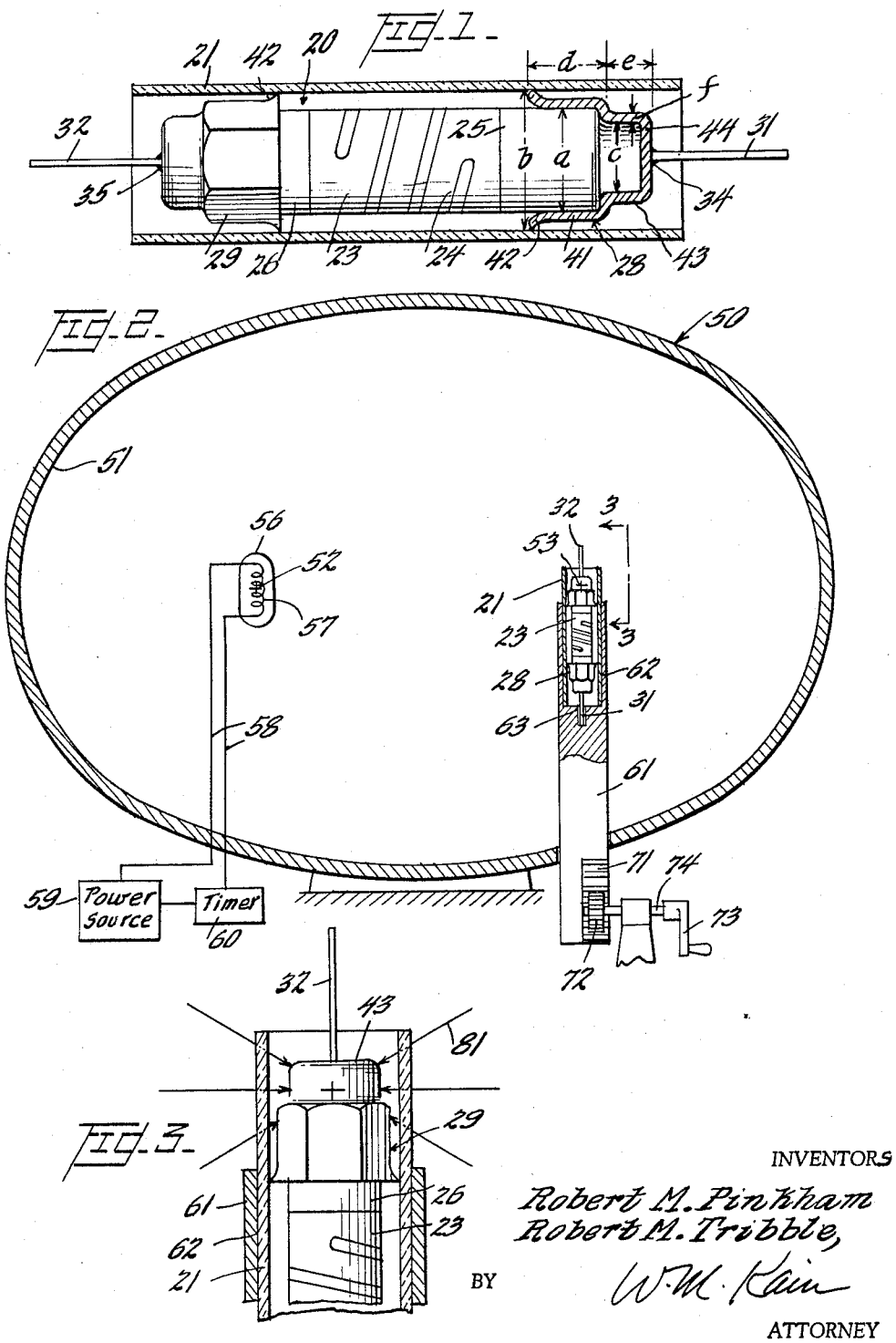

3,282,669
HEAT SEALING GLASS TO THE SURFACE
OF A BODY
Robert M. Pinkham and Robert M. Tribble, Winston-Salem, N.C., assignors to Western Electric Company Incorporated, New York, N.Y., a corporation of New York
Filed Aug. 29, 1963, Ser. No. 305,441
8 Claims. (Cl. 65—59)

This invention relates to methods of heat sealing glass and other thermoplastics to the surface of a body, and more particularly to such methods of heat sealing using radiant energy to provide the necessary heat for accomplishing sealing. This invention has special utility in encapsulating electrical components in glass.

The term "glass" as used herein encompasses a wide range of materials including glasses, thermoplastics, and many other materials not opaque to radiant energy.

In heat sealing glass to a surface of a body, it is necessary to bring the temperature of the glass and the surface of the body to the requisite sealing temperature, usually the temperature at which the glass noticeably softens and wets the surface to which it is to be sealed. In the past, this has been accomplished in various ways including exposing both the glass and the body to infrared radiation until the surfaces to be sealed together reach the sealing temperature. For many applications, this is a satisfactory approach. In other applications, this has not proved satisfactory because the application of radiant energy to both the glass and the body for a sufficient period to heat both to the sealing temperature has had deleterious effects on the body. For example, in encapsulating deposited carbon resistors in glass using infrared radiation as the heat source, the prolonged exposure of the resistor to infrared radiation and resulting heating adversely affects the electrical properties of the carbon resistance film. Further, the welded junctions of the resistor's end caps and leads become brittle.

In accordance with this invention, these and related problems have been overcome by tinting the glass with a predetermined amount of radiant energy absorbing material such that radiant energy projecting through the glass and impinging on the body is partially absorbed and partially transmitted by the glass and thereby distributed between the glass and the body in desired proportions. This distribution of energy is such that the glass and the surfaces of the body to be sealed thereto are heated to the sealing temperature substantially simultaneously or at times separated by a predetermined interval.

Accordingly, the object of this invention is to provide a new and improved method of heat sealing glass to a body using radiant energy.

It is another object of this invention to provide a new and improved method of heat sealing glass to a body in the practice of which the glass and surface of the body are raised by radiant energy to the sealing temperature substantially simultaneously or at a predetermined interval.

A further object of this invention is to provide a radiant energy method of heat sealing glass to a body in which a desired distribution of radiant energy between the glass and the body is accomplished.

A still further object of this invention is to provide a radiant energy method of encapsulating a component in glass and in which the deleterious effects of radiation and heat on the component are minimized.

With these objects in mind, this invention contemplates a method in which glass tinted with a predetermined quantity of radiant energy absorbing material is placed in contact with a body to which it is to be sealed. For example, the body may be the metallic end cap of an electrical component, and the tinted glass may be in the form of a sleeve suitable for encapsulating the component. The glass is exposed to a source of radiant energy, particularly a source of infrared energy, so that rays from the source project through the glass and impinge upon the body. The energy which falls upon the glass is distributed between the glass and the body in accordance with the filtering action provided by the tinting in the glass to effect a heat seal between the glass and the body. This distribution of energy may be controlled by varying the quantity of radiant energy absorbing material which is added to the glass.

These and other objects and advantages of this invention will be apparent from the following detailed specification when read in conjunction with the drawings, in which:

FIG. 1 illustrates an electrical component placed within a tinted glass sleeve in preparation for a heat sealed, glass encapsulation in accordance with the principles of this invention;

FIG. 2 schematically illustrates radiant energy apparatus suitable for practicing this invention with the component and glass sleeve shown in FIG. 1; and FIG. 3 is an enlarged view taken along line 3—3 of FIG. 2 illustrating the action of the tinted glass sleeve in distributing radiant energy between the glass and a component to which the glass is to be sealed.

Referring to FIG. 1, an electrical component, shown by way of example as a deposited carbon resistor 20, is placed within a cylindrical glass sleeve 21 in preparation for encapsulation. Resistor 20 includes a ceramic core 23 having a helixed, deposited carbon, resistance film 24 thereon. A pair of terminations 25 and 26 of sputtered gold make contact with resistance film 24. A pair of conductive metallic end caps 28 and 29 are force fitted onto the ends of the core in contact with the terminations. A pair of leads 31 and 32 are fixed by welds 34 and 35 to caps 28 and 29, respectively.

Caps 28 and 29 are identical and include a hollow core gripping portion 41 having an internal diameter dimension $a$ opening into a flared lip 42 of diameter dimension $b$ substantially equal to the inside diameter of sleeve 21. Portion 41 terminates in a hollow cylinder 43 having an internal diameter dimension $c$ and an end wall 44. The length of portion 41 is represented by dimension $d$; the length of cylinder 43 by dimension $e$; and the thickness of the cap by dimension $f$.

Sleeve 21 is formed of glass tinted with a predetermined amount of an infrared absorptive material. However, if sleeve 21 is formed of clear, untinted, glass and it is sought to heat seal the sleeve to cap 28 using infrared energy, it has been found necessary to subject the areas of the glass and cap to be sealed together to the radiation for a prolonged period until both surfaces to be sealed are heated to the sealing temperature. Since infrared radiation readily passes through clear glass, the cap is heated for an appreciable period before the glass itself is raised to the sealing temperature. It has been found that such prolonged heating of a deposited carbon resistor 20 results in deleterious agglomeration of the gold terminations 25 and 26, degradation of resistance film 24, and brittlization of welds 34 and 35.

If sleeve 21 were formed of glass substantially opaque and impervious to infrared radiation, such exposure to infrared radiation would immediately heat the glass. However, it has been found that so much of the radiation is absorbed by such glass that the end cap remains unheated for an unacceptably long period.

The term "tint" as used herein contemplates an addition to the tint of a radiant energy absorbing material in an amount sufficient to absorb an appreciable amount of the radiant energy employed, but not in an amount sufficient to render the glass substantially opaque to such radiation. "Tinted" glass is, therefore, neither clear nor opaque in the context discussed above.

In the practice of this invention, the ability of sleeve 21 to absorb radiant energy and heat itself, and the ability of sleeve 21 to transmit radiation to the surface to which it is to be sealed, is controlled by tinting the glass with a predetermined quantity of radiant energy absorptive material. Assuming that infrared radiation is to be employed, iron oxide (ferric oxide, ferrous oxide, or mixtures of these oxides) is a particularly effective absorptive material. However, a variety of additives are known to increase the infrared absorption of glass and could be employed for this purpose, for example cobalt oxide.

Generalizing, any material which when added to glass increases its ability to absorb the radiant energy to be employed in sealing may be used. If infrared radiation is to be employed, any additive which effectively absorbs radiation in the wave lengths above 2,000 A., and especially between 8,000 A. and 12,000 A., may be used. Those skilled in this art may readily select a tinting material once the glass and source of radiant energy have been selected.

The amount of such material added to the glass of sleeve 21 will depend upon the desired distribution of energy between the glass and the body, cap 28, to which it is to be sealed. The desired distribution of energy between the glass and the body will, in turn, depend upon the desired degrees of heating which is to be imparted to each.

For example, assume a component such as resistor 20, which cannot withstand prolonged intensive exposure to radiation and heating, is to be encapsulated in glass. The minimum total exposure of the resistor to heating radiation consistent with bringing the surface to be sealed to the sealing temperature is desirable. The desired distribution of energy between the glass and the surface to which it is to be sealed will depend upon the relative heat absorptive characteristics of the glass and the resistor, the relative abilities of the glass and the resistor to reflect and to reradiate, and the ability of the glass to distribute energy between itself and the resistor. As will be apparent to those familiar with this art, the heat absorptive characteristics of the resistor and its ability to reflect and reradiate depend upon the materials of which it is made, its mass, shape, dimensions, and surface conditions. The same is true of glass. The heat absorptive characteristics and ability to reflect and reradiate of the resistor and the glass mass may be calculated or determined empirically. The term "heat absorptive characteristics" as used hereinafter is intended to encompass heat absorptive characteristics as well as the ability to reflect and reradiate.

In this example, radiant energy absorptive material is added to the glass so that the total radiant energy which falls upon the glass is distributed between the glass and the resistor in precisely the right proportions to bring the glass and the surfaces to which it is to be sealed to the sealing temperature substantially simultaneously. Total exposure time to radiation is thereby minimized along with the possibility of deleterious effects upon the resistor.

Referring to FIG. 2, apparatus suitable for the practice of this invention may include a conventional radiant energy furnace 50 having a highly reflective, elliptical internal wall 51, the foci of which are at points 52 and 53. A source of infrared radiation, lamp 56, is positioned so that its filament 57 is centered about focus 52. Leads 58 connect the filament to a suitable electrical power source 59 and the burning time of the lamp is controllable by a timer 60.

A pedestal 61 is provided with an axial bore 62 (FIGS. 2 and 3) having a diameter slightly larger than the outside diameter of a sleeve 21. A second axial bore 63 of a diameter sufficiently large to accommodate a lead such as lead 31 communicates with bore 62. The depth of bore 62 is such as to support sleeve 21 so that all but a predetermined portion of the sleeve is masked against radiation by the walls of pedestal 61. The depth of bore 63 is such as to support the resistor in the desired position within sleeve 21. This position is illustrated in FIGS. 1 and 3.

It may be desirable to provide for adjustment of the sleeve and resistor relative to focus 53 of the furnace. This is accomplished by providing pedestal 61 with a rack 71 which engages a pinion 72. The pinion may be rotated and the position of pedestal 61 adjusted by rotating a handle 73 fixed on a shaft 74 along with the pinion.

In operation, a resistor 20 is placed within a sleeve 21 and the sleeve is inserted within bore 62 to assume the position best illustrated in FIG. 3. The sleeve is supported on the bottom surface of bore 62 while lead 31 is accommodated within bore 63 and supports the resistor in the desired position. Handle 73 is turned to adjust the position of the sleeve and resistor relative to focus 53. Power source 59 is activated to heat filament 57 for a desired period as controlled by timer 60. As is known, energy originating at one focus of an elliptical furnace is caused to concentrate at the other focus, in this instance focus 53. As seen in FIG. 3, unmasked portions of sleeve 21 are directly exposed to infrared radiation. A portion of the radiation (indicated by arrows 81, FIG. 3) which falls upon the sleeve is arrested by the sleeve causing it to become heated. The unarrested portion of this radiation (indicated by the dotted portion of arrows 81, FIG. 3) passes through the sleeve to heat the end cap 29. Since the sleeve 21 has been tinted in accordance with the principles of this invention, as discussed above, the internal walls of the sleeve and the external surface of the cap reach the sealing temperature substantially simultaneously and a partial encapsulation results.

The specific examples set out below should provide further insight into the practice of the above-described method using the above discussed apparatus.

EXAMPLE I

*End Caps 28 and 29:*
    Material—Alloy comprising approximately 28% Nickel, 18% Cobalt, 53% Iron available under the trade names "Kovar" "Fernico" and "Rodar."
    Dimensions—$a$, .061 inch; $b$, .093 inch; $c$, .050 inch; $d$, .040 inch; $e$, .040 inch; $f$, .012 inch.

*Core 23:*
    Material—Alkaline earth porcelain with thin coating of pyrolytic carbon thereon having terminations of sputtered gold.
    Dimensions—Diameter, .062 inch; Length, .300 inch.

*Leads 31 and 32:*
    Material—nickel.
    Dimensions—diameter, .025 inch; length, 1.625 inches.

*Glass Sleeve 21:*
    Material—$SiO_2$, 67.3%; $Na_2O$, 4.6%; $K_2O$, 1.0%; $MgO$, 0.2%; $B_2O_3$, 24.6%; $AL_2O_3$, 1.7%.
    Dimensions—length, .360 inch; inside diameter, .095 inch; wall thickness, .015 inch.

*Radiant Energy Absorptive Material:*
    Material—Iron oxide 3½% by weight of the glass.

*Heat Cycle:*
    Lamp, 600-watt, quartz-iodine incandescent bulb; exposure time 3½ seconds; power source 96 volts A.C.; dimensions of furnace—ellipsoid 8" in diameter in largest circular plane and 1.6333 inches between foci, exposure of sleeve above mask—.125 inch.

EXAMPLE II

All factors remain the same as in Example I excepting that the percentage of iron oxide added to the glass is reduced to 1½%. Satisfactory sealing is achieved.

EXAMPLE III

All factors remain the same as in Example I excepting that the percentage of iron oxide content of the glass is changed to 4%. Satisfactory sealing is achieved.

EXAMPLE IV

All factors remain the same as in Example I excepting that the iron oxide content of the glass is reduced substantially below 1½% and the heat cycle is prolonged to achieve heat sealing. The resistor is overheated and deleterious effects appear thereon due to the prolonged heating necessary to bring the glass to the sealing temperature.

EXAMPLE V

All factors and dimensions remain the same as in Example I excepting that the iron oxide content of the glass sleeve 21 is raised substantially above 4%. Unsatisfactory sealing is achieved due to insufficient heating of the end cap accompanied by excessive softening of the glass sleeve.

In the above discussed examples of this method, it has been assumed desirable to raise the glass and the body to which it is to be sealed to the sealing temperature simultaneously and in a minimum of time. While this will often be a desirable end in processes such as encapsulation of electrical components in glass, there are other instances in which it may be desirable to bring the two surfaces to the sealing temperature at different times separated by a predetermined interval. This may be conveniently accomplished by an appropriate increase or decrease in the amount of radiant energy absorptive material added to the glass of sleeve 21.

This invention has been illustrated in connection with specific problems of encapsulating electrical components in glass. This invention, however, contemplates a more general application in heat sealing glass, or other materials, particularly thermoplastics, not opaque to radiant energy, to a variety of surfaces. Therefore, it is to be understood that the above-described methods are simply illustrative of an application of the principles of this invention and many other modifications may be made without departing from the invention.

What is claimed is:

1. In a method of heat sealing glass to a body which is more readily heated by radiant energy than clear glass, the steps of
    placing glass having a predetermined quantity of radiant energy absorbing material incorporated therein in contact with said body, and
    projecting sufficient radiant energy through the glass and onto the body to distribute the energy between the glass and the body in accordance with the quantity of radiant energy absorbing material incorporated in the glass and effect a heat seal between the glass and the body.

2. In a method of heat sealing glass to a body which has higher heat absorptive characteristics than clear glass, the steps of
    placing glass having a predetermined quantity of radiant energy absorbing material incorporated therein in contact with said body,
    selectively masking portions of the glass and body to prevent exposure thereof to radiant energy, and
    projecting sufficient radiant energy through the unmasked portions of the glass and onto the body to distribute the energy between the unmasked portions of the glass and the adjacent portions of the body in accordance with the quantity of radiant energy absorbing material incorporated in the glass and effect a heat seal between the unmasked portions of the glass and the body.

3. In a method of heat sealing a body of known heat absorptive characteristics to a mass of glass of known lower heat absorptive characteristics using infrared energy to elevate the body and mass to the sealing temperature, the steps of
    placing the body in contact with the glass mass which has had incorporated therein a quantity of infrared energy absorbing material sufficient to absorb a predetermined portion of infrared energy impinging upon the glass mass, said portion being related to the ratio of said known heat absorptive characteristics to achieve elevation of the body surface and glass mass to the sealing temperature within a predetermined interval of exposure to infrared radiation, and
    projecting infrared energy through the mass and onto the body to effect a heat seal between the mass and the body.

4. In a method of encapsulating a metal component in glass, the steps of
    placing the component within a glass sleeve having incorporated therein a predetermined quantity of radiant energy absorbing material, and
    projecting sufficient radiant energy through the glass and onto the component to distribute the energy between the sleeve and the component in accordance with the quantity of radiant energy absorbing material incorporated in the glass and effect a heat seal glass encapsulation of the component.

5. In a method of encapsulating a component of known heat absorptive characteristics within a glass sleeve of known lower heat absorptive characteristics, the steps of
    placing the component within the sleeve which has had incorporated therein infrared energy absorbing material in a quantity sufficient to absorb a predetermined portion of infrared energy impinging upon the sleeve, said portion being a function of the ratio of the known heat absorptive characteristics of the sleeve and the component, and
    projecting sufficient radiant energy through the sleeve and onto the component to effect a heat seal encapsulation of the component.

6. In a method of encapsulating a component of known heat absorptive characteristics within a glass sleeve of known lower heat absorptive characteristics using infrared energy to elevate the sleeve and component to the sealing temperature, the steps of
    placing the component within the sleeve which has had incorporated therein a quantity of infrared energy absorbing material sufficient to absorb a predetermined portion of infrared energy impinging upon the sleeve, said portion being related to the ratio of said known heat absorptive characteristics to achieve simultaneous elevation of the component and the sleeve to the sealing temperature when exposed to infrared radiation, and
    projecting sufficient radiant energy through the sleeve and onto the component to effect a heat seal encapsulation of the component.

7. A method of encapsulating in accordance with claim 6 wherein said sleeve is made of borosilicate glass and said infrared energy absorbing material comprises iron oxide.

8. A method of heat sealing a glass sleeve to a support element of an electrical component having other heat sensitive elements that are deleteriously affected by the application of infrared radiant energy above a predetermined level for a predetermined period of time which comprises the steps of
    forming a tinted glass sleeve with an amount of iron oxide incorporated therein sufficient to absorb infrared radiant energy above said predetermined level, but transparent to amounts of infrared radiant energy sufficient to heat a component positioned within said sleeve to bond the sleeve to said support element,
    inserting said component in said sleeve, subjecting said glass sleeve and component to infrared radiant energy for a period of time less than said predetermined period of time but of sufficient time duration to heat and soften said glass sleeve and heat said component to a temperature below that which is deleterious to the heat sensitive elements, and then removing said glass sleeve and component from said infrared radiant energy to allow said glass sleeve to bond to said support element.

References Cited by the Examiner
UNITED STATES PATENTS

| | | | |
|---|---|---|---|
| 2,622,053 | 12/1952 | Clowe et al. | 156—272 |
| 3,021,243 | 2/1962 | Bethge | 156—272 |

DONALL H. SYLVESTER, *Primary Examiner.*

HOWARD R. CAINE, G. R. MYERS,
*Assistant Examiners.*